United States Patent
Salcedo (10) Patent No.: US 8,131,759 B2
(45) Date of Patent: Mar. 6, 2012

(54) METHOD AND APPARATUS FOR IDENTIFYING AND RESOLVING CONFLICTING DATA RECORDS

(75) Inventor: Jonathan Salcedo, San Francisco, CA (US)

(73) Assignee: Asurion Corporation, Nashville, TN (US)

(*) Notice: Subject to any disclaimer, the term of this patent is extended or adjusted under 35 U.S.C. 154(b) by 565 days.

(21) Appl. No.: 12/253,412

(22) Filed: Oct. 17, 2008

(65) Prior Publication Data
US 2009/0106245 A1    Apr. 23, 2009

Related U.S. Application Data

(60) Provisional application No. 60/980,980, filed on Oct. 18, 2007.

(51) Int. Cl.
*G06F 17/30* (2006.01)
(52) U.S. Cl. .................... 707/780; 707/610
(58) Field of Classification Search .............. None
See application file for complete search history.

(56) References Cited

U.S. PATENT DOCUMENTS

| | | | | |
|---|---|---|---|---|
| 2004/0044799 A1* | 3/2004 | Sivaraman et al. | ........... | 709/253 |
| 2004/0172393 A1* | 9/2004 | Kazi et al. | ........... | 707/6 |
| 2004/0181526 A1* | 9/2004 | Burdick et al. | ........... | 707/6 |
| 2004/0193578 A1* | 9/2004 | Yaeger | ........... | 707/3 |
| 2005/0216443 A1* | 9/2005 | Morton et al. | ........... | 707/3 |

* cited by examiner

*Primary Examiner* — Belinda Xue
(74) *Attorney, Agent, or Firm* — SNR Denton US LLP (57) ABSTRACT

A method and apparatus for identifying and resolving conflicting data records are disclosed. The individual data fields of a master record are compared with the corresponding data fields of each source record in a particular data set. For each, one of various matching algorithms is used to assign a field matching score indicating the extent to which the data in the two data fields matches. The particular algorithm used to determine the extent of a match and to assign the corresponding score is dependent on the type of the data field. Once all of the data fields for a particular source record have been analyzed, the sum of the field matching scores is tallied to determine an overall record matching score for that particular source record.

18 Claims, 10 Drawing Sheets

RECORD SET A

RECORD SET B

| RECORD PAIRING | RECORD MATCHING SCORE |
|---|---|
| (A1,B1) ←——→ | 7 |
| (A1,B2) ←——→ | 0 |
| (A1,B3) ←——→ | 1 |
| (A1,B4) ←——→ | 1 |
| (A1,B5) ←——→ | 0 |
| (A1,B6) ←——→ | 85 |
| (A1,B7) ←——→ | 0 |
| (A1,B8) ←——→ | 3 |
| (A2,B1) ←——→ | 7 |
| (A2,B2) ←——→ | 0 |
| (A2,B3) ←——→ | 0 |
| (A2,B4) ←——→ | 2 |
| (A2,B5) ←——→ | 0 |
| (A2,B6) ←——→ | 0 |
| (A2,B7) ←——→ | 0 |
| (A2,B8) ←——→ | 0 |
| (A3,B1) ←——→ | 2 |
| (A3,B2) ←——→ | 98 |
| (A3,B3) ←——→ | 0 |
| (A3,B4) ←——→ | 0 |
| (A3,B5) ←——→ | 0 |
| (A3,B6) ←——→ | 0 |
| (A3,B7) ←——→ | 1 |
| (A3,B8) ←——→ | 5 |
| (A4,B1) ←——→ | 9 |

FIG. 5 METHOD FOR CALCULATING RECORD MATCHING SCORE)

RECORD B1

| FIRST NAME | ROBERT |
|---|---|
| LAST NAME | HILLENGERG |
| ADDRESS (STREET) | 101 El Camino Real |
| ADDRESS (CITY) | Reno |
| ADDRESS (STATE) | NV |
| ADDRESS (ZIP) | 89505 |
| EMAIL 1 | Bhillenb@yahoo.com |
| EMAIL 2 | bobh@work.com |
| TELEPHONE WORK | (609) 258-6593 |
| TELEPHONE MOBILE | (702) 123-1395 |

RECORD A1

| FIRST NAME | ROB |
|---|---|
| LAST NAME | HILLENGERG |
| ADDRESS (STREET) | 101 El Camino Real |
| ADDRESS (CITY) | Reno |
| ADDRESS (STATE) | NV |
| ADDRESS (ZIP) | 89505 |
| EMAIL 1 | Bhillenb@yahoo.com |
| EMAIL 2 | bobh@work.com |
| TELEPHONE WORK | (702) 439-9087 |
| TELEPHONE MOBILE | (702) 123-1395 |

RECORD MATCHING SCORE = FIELD GROUP MATCHING SCORE (NAME FIELD GROUP)
+ FIELD GROUP MATCHING SCORE (ADDRESS FIELD GROUP)
+ FIELD GROUP MATCHING SCORE (EMAIL FIELD GROUP)
+ FIELD GROUP MATCHING SCORE (PHONE FIELD GROUP)

FIG. 6

FIELD GROUP MATCHING SCORE = UNIQUENESS + DIFFERENCE MAGNITUDE + CONFLICT SCORE

CALCULATING "MAGNITUDE" COMPONENT

EXAMPLE 1:

| R | O | B |

MAGNITUDE = 100 − (3 * 100/250) = 98.8

| R | O | B | E | R | T |
⎵
3

EXAMPLE 2:

| M | I | K | E |

MAGNITUDE = 100 − (3 * 100/250) = 98.8

| M | I | C | H | A | E | L |
⎵
5

MAGNITUDE = 5

EXAMPLE 3:

| F | R | E | D |

MAGNITUDE = 6

| B | A | R | N | E | Y |
⎵
6

FIG. 10

METHOD AND APPARATUS FOR IDENTIFYING AND RESOLVING CONFLICTING DATA RECORDS

RELATED APPLICATION

This application is a NON-PROVISIONAL of and claims priority to U.S. Provisional Patent Application 60/980,980, filed 18 Oct. 2007.

FIELD OF THE INVENTION

The present invention generally relates to data synchronization techniques. More specifically, the present invention relates to a method and apparatus for identifying duplicate and/or conflicting data records (e.g., contact information), and resolving issues related thereto.

BACKGROUND

With the increasing popularity of portable, wireless devices (e.g., laptop computers, mobile phones, personal digital assistants (PDAs), handheld global positioning system (GPS) devices, and so on), users have an increased need to synchronize data. For instance, a user may store data—such as personal and/or business contact information—on a personal computer (PC) or on a server of a web-based service. It is often desirable to synchronize this data with data stored on a portable device, such that a copy of the data is available on the wireless device for access by the user when on the move. Similarly, a user may want to synchronize data so that data entered on a portable device is backed-up or archived at a centrally located device. As any one of several devices may be used to input data, it is often the case that data conflicts arise. For example, a user may utilize a portable device to input a new telephone number for one of his or her contacts, thereby creating a data conflict between the new telephone number (as entered at the portable device) and the previous telephone number (as stored on the centralized PC or web-based service).

In order to synchronize two data records of two data sets, it is first necessary to identify two data records that match or partially match, such that the data associated with each record can be analyzed to determine whether any conflicts exist with respect to its matching or partially matching counterpart. This process is generally referred to as "matching".

One method of matching records is to assign each data record a unique identifier, which is maintained with the data record at each device. Accordingly, two records are considered to match when they have the same identifier. However, it is not always the case that each user device supports the use of unique record identifiers. Many devices simply do not support unique record identifiers. Furthermore, many devices modify the record identifier when data items are added or deleted to a particular record, or field. When unique record identifiers are not implemented and assigned to each data record, a different method of identifying matching records and resolving conflicts is required.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DESCRIPTION

As presented herein, the invention is described in the context of a contact management application—for example, an application used to enters store and manage personal and/or business contact information on one or more user devices. However, the present invention should not be construed as being limited to this context. Those skilled in the art will appreciate that the present invention is applicable in a wide variety of other contexts as well, particularly in those contexts involving record synchronization.

Consistent with one embodiment of the invention, an apparatus and method for identifying "matching" records in two record sets is provided. As used herein, the term "matching" does not necessarily mean that two elements (e.g., records) are identical. Instead, two elements are said to "match" when a score calculated with a matching algorithm (as described herein) meets or exceeds a threshold score, and/or when a score is the highest of all scores calculated with a particular matching algorithm. The matching algorithms described herein have a variety of uses in different applications, to include synchronizing the data fields of matching records from two record sets, and resolving any conflicting data in the data fields of two "matching" records.

The matching algorithms described herein can be executed or performed on various nodes of a computer network. For example, in one embodiment of the invention, the matching algorithms may be executed or performed on one or more handsets or mobile devices. Alternatively, the matching algorithms may be executed or performed at a centralized data storage and processing center, such as a network-based contact information management server. It is often the case that a centralized node or server is referred to as a master device, whereas a client device, such as a handset, is referred to as a source device. Accordingly, a record associated with or stored on a centralized server may be referred to as a master record, whereas a record associated with, or stored on, a client device may be referred to as a source record. In any case, the matching algorithms described herein are designed to be commutative, such that the algorithms are not dependent upon whether a record is a "master" record or a "source" record.

Reference will now be made in detail to an implementation consistent with the present invention as illustrated in the accompanying drawings. Wherever possible, the same reference numbers will be used throughout the drawings and the following description to refer to the same or like parts. Although discussed with reference to these illustrations, the present invention is not limited to the implementations illustrated therein. Hence, the reader should regard these illustrations merely as examples of embodiments of the present invention, the full scope of which is measured only in terms of the claims following this description.

Figure 1:
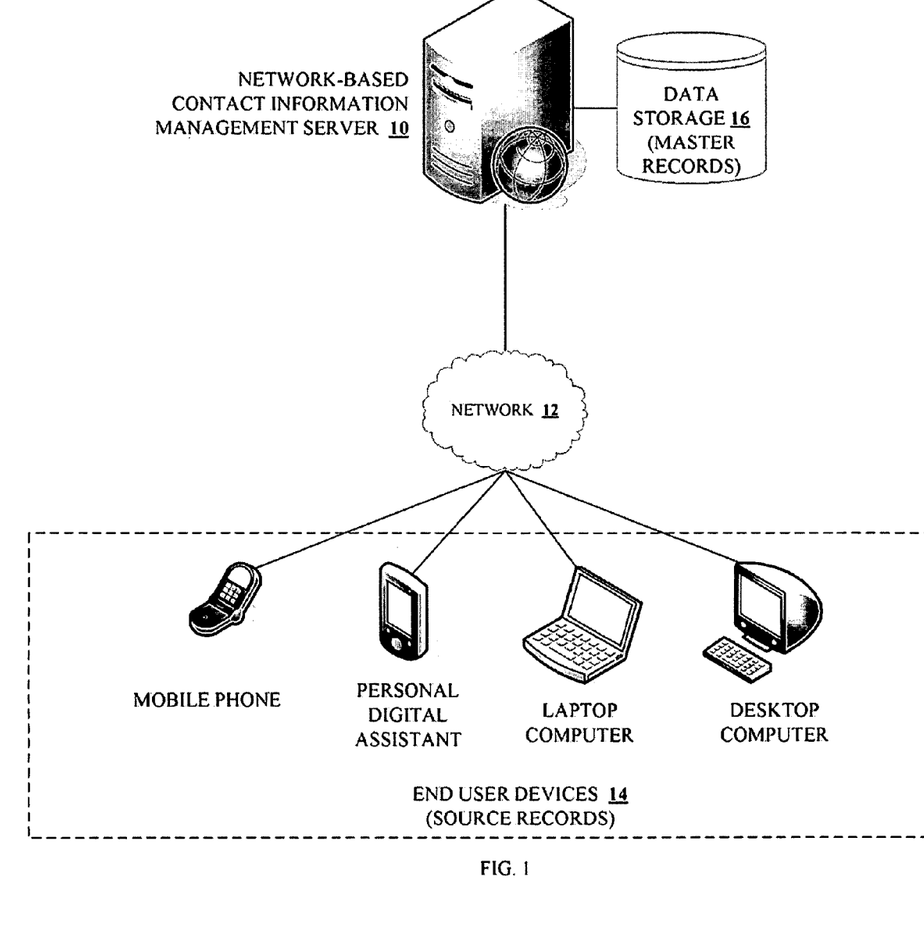
FIG. 1 illustrates a variety of end user devices, which may be configured to operate with, and synchronize data stored at, a network-based data service, according to an embodiment of the invention.

FIG. 1 illustrates a variety of end user devices, which may be configured to operate with, and synchronize data stored at, a network-based data service, according to an embodiment of the invention. As illustrated in FIG. 1, a network-based contact information management server 10 is configured to provide a data service over a network 12 to a variety of end user devices 14. In this case, the contact information management server 10 is a master device, while each end user device is a source device. Accordingly, the records associated with and stored at the contact information management server 10 are considered to be master records, while the records associated with and stored at each end user device 14 are source records. In one embodiment of the invention, the contact information management server 10 is coupled to one or more data storage devices 16, where master records are stored.

The network 12 used for communicating data between the network-based contact information management server 10 and the various end user devices 14 will vary depending upon the particular implementation. Accordingly, the invention is independent of any particular network, or communications or networking protocols. In one embodiment of the invention, the network may be a wireless data network operated by a wireless services provider or operator. Alternatively, the network may be a wired (e.g., Ethernet-based) or wireless (e.g., 802.11a/b/g/n, or related standard) network. In one embodiment, the network may 12 may simply be a common communication protocol shared between the server 10 and the end user device 14, and a cable (e.g., Universal Serial Bus (USB) cable).

Generally, a user will interact with one or more end user devices by entering various information, such as contact information for personal and/or business contacts. On occasion, a synchronization process will be initiated (e.g., either automatically, or manually), and the contact information stored at a particular end user device will be synchronized with the contact information stored at the contact information management server 10, or vice versa. Accordingly, the invention provides an easy and simple method for backing up, and restoring data. For example, data entered at one handset may be communicated to the server 10, where the data records are "matched" with existing data records and any conflicts resolved, and then at a later time, the data may be restored to the same, or a different handset.

In one embodiment of the invention, the matching analysis and the conflict resolution analysis occur at the master device (e.g., the contact information management server 10). Accordingly, during the synchronization process the source records (or a portion thereof are communicated from an end-user device to the contact information management server 10 over the network 12. In an alternative embodiment, the matching and conflict resolution analysis may occur on the end user device. In this case, the master records (or a portion thereof) may be communicated from the contact information management server 10 to the end user device. Furthermore, in one embodiment of the invention, multiple synchronization modes may be supported, such that a user may perform a full synchronization, in which case all source records are communicated to the master device, or a partial synchronization, in which case only records which have been modified since the last synchronization process was performed are communicated to the master device.

Figure 2:
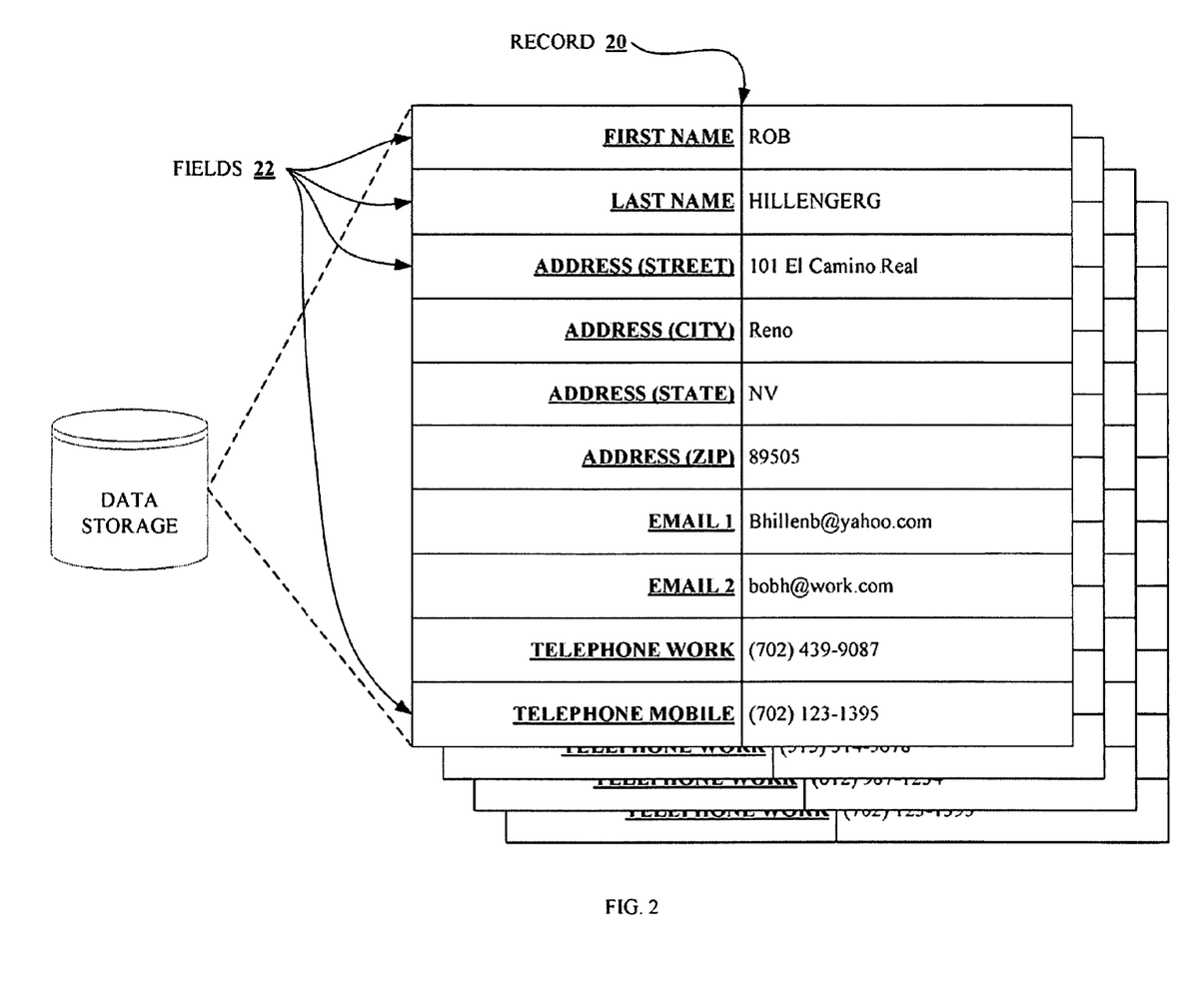
FIG. 2 illustrates an example of a data record with several data fields, according to an embodiment of the invention.

FIG. 2 illustrates an example of a data record 20 with several data fields 22, according to an embodiment of the invention. For example, the data record 20 illustrated in FIG. 2 has separate fields for a first and last name, several fields for an address (e.g., street, city, state, and zip), two individual fields for email addresses, and two additional fields for telephone numbers. Accordingly, the field types for the various fields illustrated in FIG. 2 may be specified as FIRST_NAME, LAST_NAME, ADDRESS_STREET, ADDRESS_CITY, EMAIL_1, and so on. As described in greater detail below, the various fields may be grouped together by type (e.g., name fields, address fields, phone number fields, and so on) to form field groups. Accordingly, in one embodiment of the invention, analysis may be performed on a field group, as opposed to an individual field. In any case, those skilled in the art will appreciate that various devices and software applications support a wide variety of different fields, and field types, with any number of naming conventions. Accordingly, the present invention should not be construed to be limited by the field types or naming conventions illustrated in FIG. 2.

Figure 3:
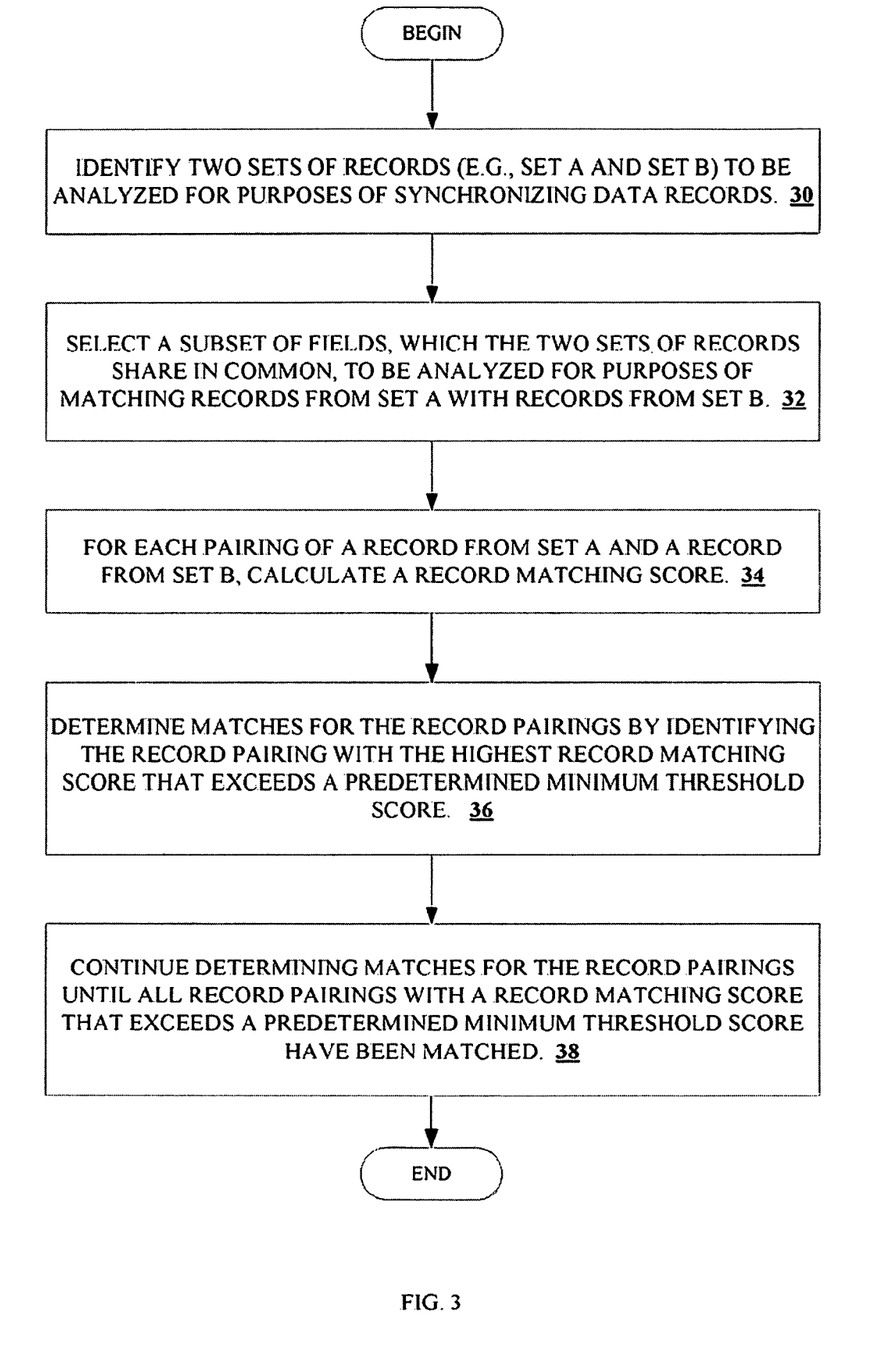
FIG. 3 illustrates an example of a method for identifying matching records in two sets of records according to a matching algorithm consistent with an embodiment of the invention.

FIG. 3 illustrates an example of a method for identifying matching records in two sets of records according to a matching algorithm consistent with an embodiment of the invention. At operation 30 two sets of records (e.g., record set A, and record set B) are identified. For example, a user may initiate a synchronization process on a handset, or the handset may automatically initiate a synchronization process according to a predetermined synchronization schedule. Accordingly, a record set associated with and stored on the handset may be analyzed for purposes of matching records from the handset with records in a second record set at a centralized contact management server 10.

At operation 32, a subset of the fields that tie two record sets share in common, is selected. For example, depending on the particular record sets being analyzed, and/or the particular fields included in the record sets, a particular subset (e.g., a group of fields, or multiple groups of fields) of those fields may be selected for purposes of determining a record match. For instance, the matching algorithm may be configured such that those fields that are most likely to indicate whether two records match may be selected for analysis. As described in greater detail below, the individual fields may be organized into groups, such that analysis is performed on a group of fields. For example, if a record has a field for both the first and last name of a person (e.g., FIRST_NAME, LAST_NAME), then the two fields may be grouped together to form a name field for purposes of the field analysis performed by the record matching algorithm. It is possible that a single field may comprise its own group.

Figure 4:
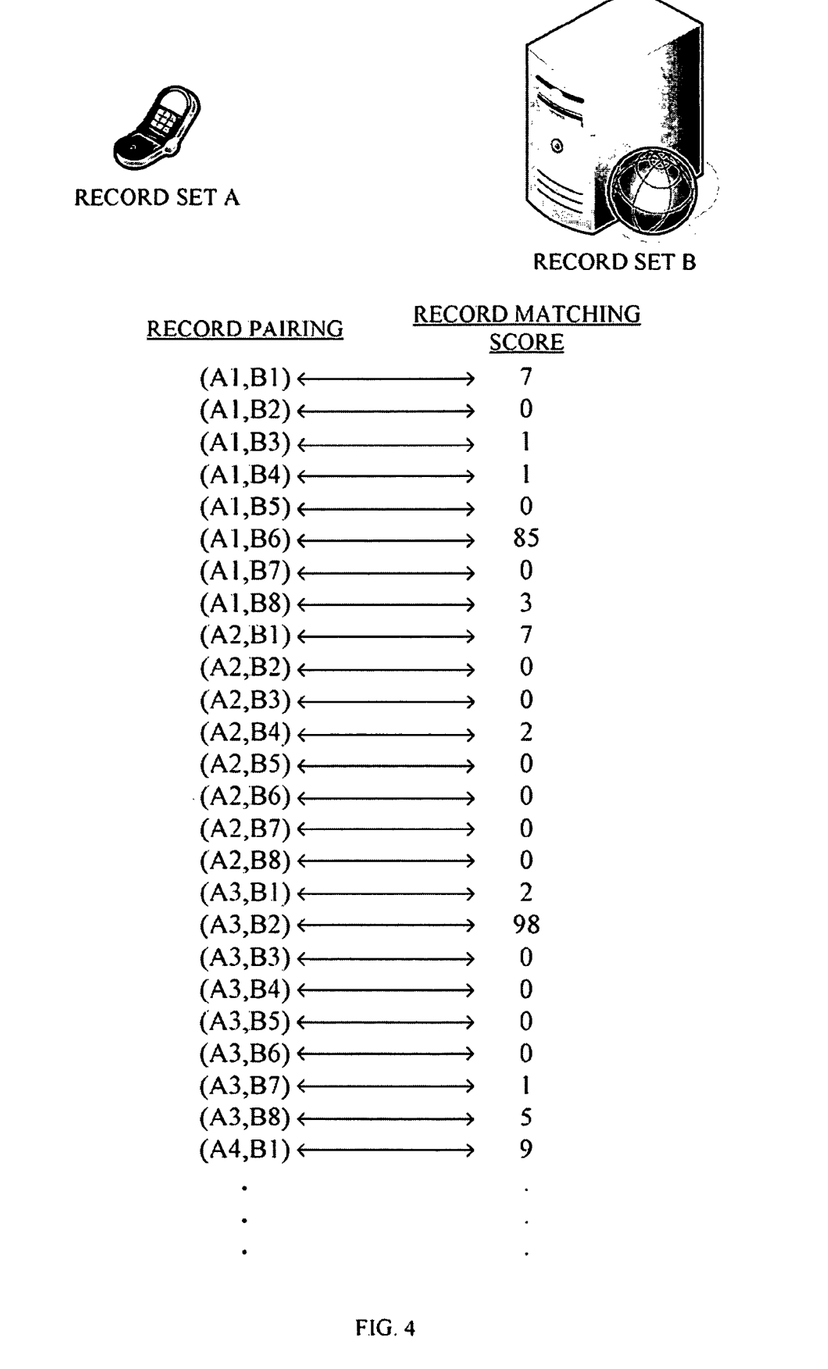
FIG. 4 illustrates an example of how record matching scores are assigned to pairs of records for purposes of determining "matching" records, according to an embodiment of the invention.

Next, at operation 34, for each pairing of a record from the first set and a record from the second set, a record matching score is calculated. For example, as illustrated in FIG. 4, a record from record set A is paired with each record in record set B, and for each pairing, a record matching score is determined. As illustrated in FIG. 4, the record pair (A1,B1)— where A indicates record set A, and 1 indicates record number 1 in the set—has a record matching score of "7", whereas record pair (A1,B2) has a record matching score of "0", and so on.

As illustrated in FIG. 4, the record matching scores, as well as the component scores used to derive the record matching scores, may be normalized to provide a more meaningful score for purposes of comparison with one another. For example, record matching scores may be normalized to fall within a particular range, such as zero through one-hundred, where a score of zero indicates a low likelihood of a record match, and a score of one-hundred indicates a high likelihood of a record match. Similarly, the individual component scores (described in greater detail below) may be normalized, and or scaled.

In one embodiment of the invention, the record matching score for each record pair is recorded for later analysis. Alternatively, in one embodiment of the invention, only those record pairs that have a record matching score that exceeds some predetermined minimum threshold are recorded. For instance, if a record pair has a record matching score that meets or exceeds the threshold score, the record pair (and associated record matching score) may be added to a record matching candidate list. All other record pairings are assumed not to match.

After all record pairs have been analyzed and assigned a record matching score, at operation 36 record matches are determined. For example, in one embodiment of the invention, record matches may be determined by identifying the record pair with the highest record matching score that exceeds the threshold matching score. Once a particular record has been matched with a counterpart, both records in the pair are excluded from the analysis for identifying further matches. Accordingly, after a first match is made, at operation 38 the record pair with the next highest record matching score is identified, and so on, until all record pairs having record matching scores exceeding the threshold matching score are identified.

Figure 5:
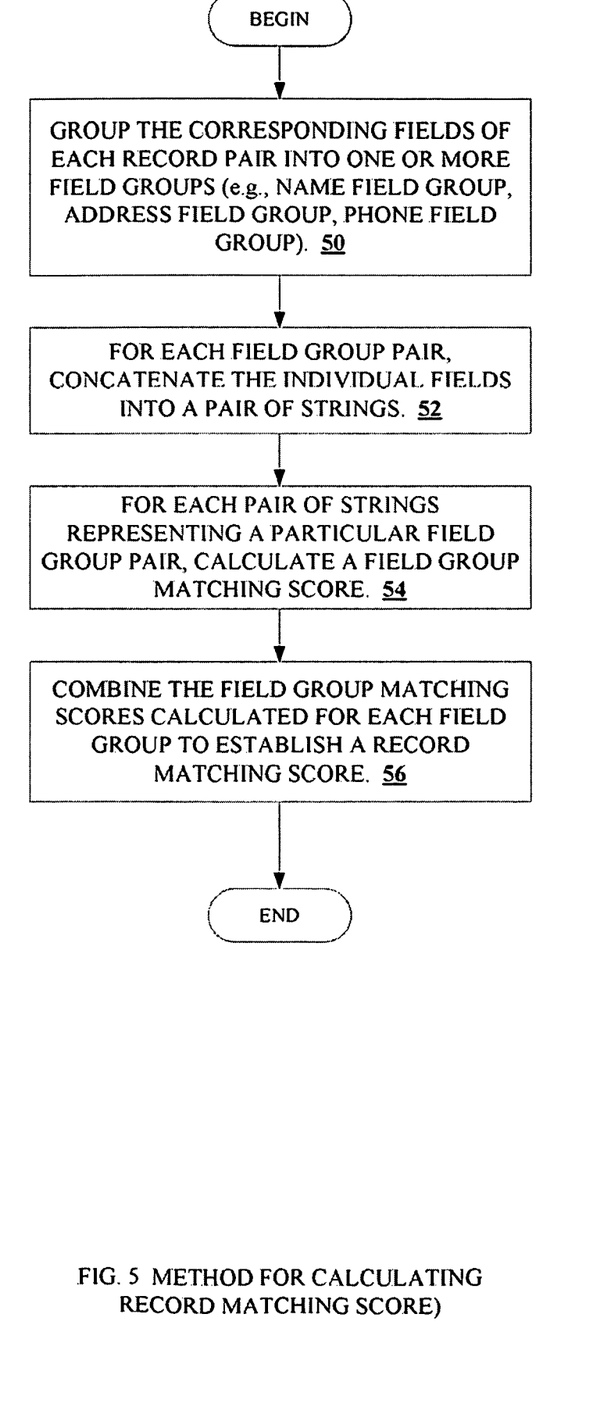
FIG. 5 illustrates a method for calculating a record matching score for a pair of records, according to an embodiment of the invention.

FIG. 5 illustrates a method for calculating a record matching score, according to an embodiment of the invention. The record matching score assigned to each record pair (e.g., as illustrated in FIG. 4) is based on how well the individual fields (or field groupings) in the record pair correspond or match. Accordingly, at operation 50, fields are grouped, for example, based on a natural grouping. For instance, all fields relating to a person's name may be grouped together to form a name field group. Similarly, all of the address fields may be grouped to form an address field group, and so on. In various embodiments of the invention, the field groupings are configurable, and the actual fields included in any one group may vary. For example, in one embodiment of the invention, one or more fields that would naturally be associated with one group or another, may be excluded from a group, for example, because of a low likelihood of indicating a record match.

At operation 52, for each field group pairing, the individual fields are concatenated to form two strings. For example, all of the name fields in one record are concatenated together, while all the name fields in the corresponding record of the pair are concatenated together. In one embodiment of the invention, the order in which the individual fields are concatenated is dependent upon a byte level comparison of the fields. For example, concatenating the name fields in Record A11 and Record B1 of FIG. 6 results in the two strings, "HLLENBERGROB" and "HILLENBERGROBERT". In this case, the last name "HILLENBERG" is positioned in the string before "ROB" or "ROBERT" because on a byte-level comparison, "H" precedes "R".

Referring again to FIG. 5, at operation 54, for each pair of strings representing a field group pair, a field group matching score is calculated. For instance, referring again to FIG. 6, a field group matching score is determined for the field groups for the name field group 60, address field group 60, email field group 64, and telephone field group 66. The particular method by which a field group matching score is determined is described in greater detail below in connection with the descriptions of FIGS. 7 through 10. In general, a field group matching score has four components: a "uniqueness" component, a "difference" component, a "magnitude" component, and a conflict score.

At operation 56, the field group matching scores for each pair of field groups are combined to determine a record matching score. In one embodiment, each field group may contribute to the record matching score relative to a weighting factor associated with the field group. For example, an email field group may be weighted more heavily than a name field group because a conflict with respect to a name may be attributable to a nickname (e.g., Rob versus Robert), whereas conflicting email addresses are more likely to indicate that the records do not match. Accordingly, in one embodiment of the invention, the fields or field groups that are determined to be most suggestive of a match are given a greater weight than other fields.

Figure 6:
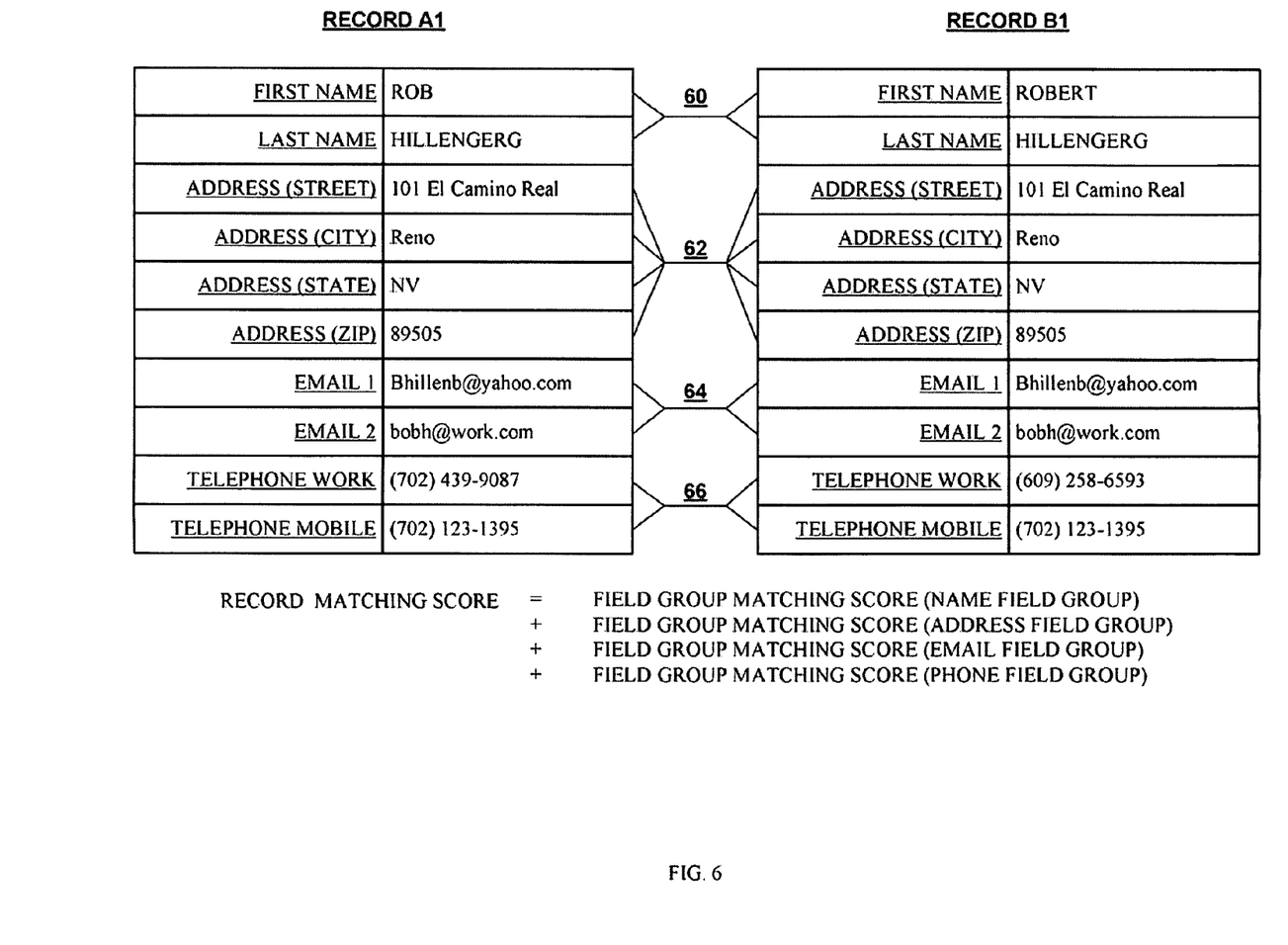
FIG. 6 illustrates an example of how a record matching score may be calculated, according to an embodiment of the invention, for a pair of records.

FIG. 6 illustrates an example of how a record matching score may be calculated, according to an embodiment of the invention, for a pair of records including record A1, and record B1. As indicated in FIG. 6, the fields for first and last name form one field group. Similarly, the four address fields form yet another field group, as do the email fields, and finally, the telephone fields. Accordingly, the first and last names indicated in record A1 and B1 are combined (e.g., concatenated) to form the strings, "HILLENBERGROB" and "HILLENBERGROBERT.". Similarly, the address fields, email fields, and telephone fields are concatenated to form pairs of strings for each field group. Consequently, the record matching score is determined as a combination of the field group matching scores for the four different field groups.

Figure 7:
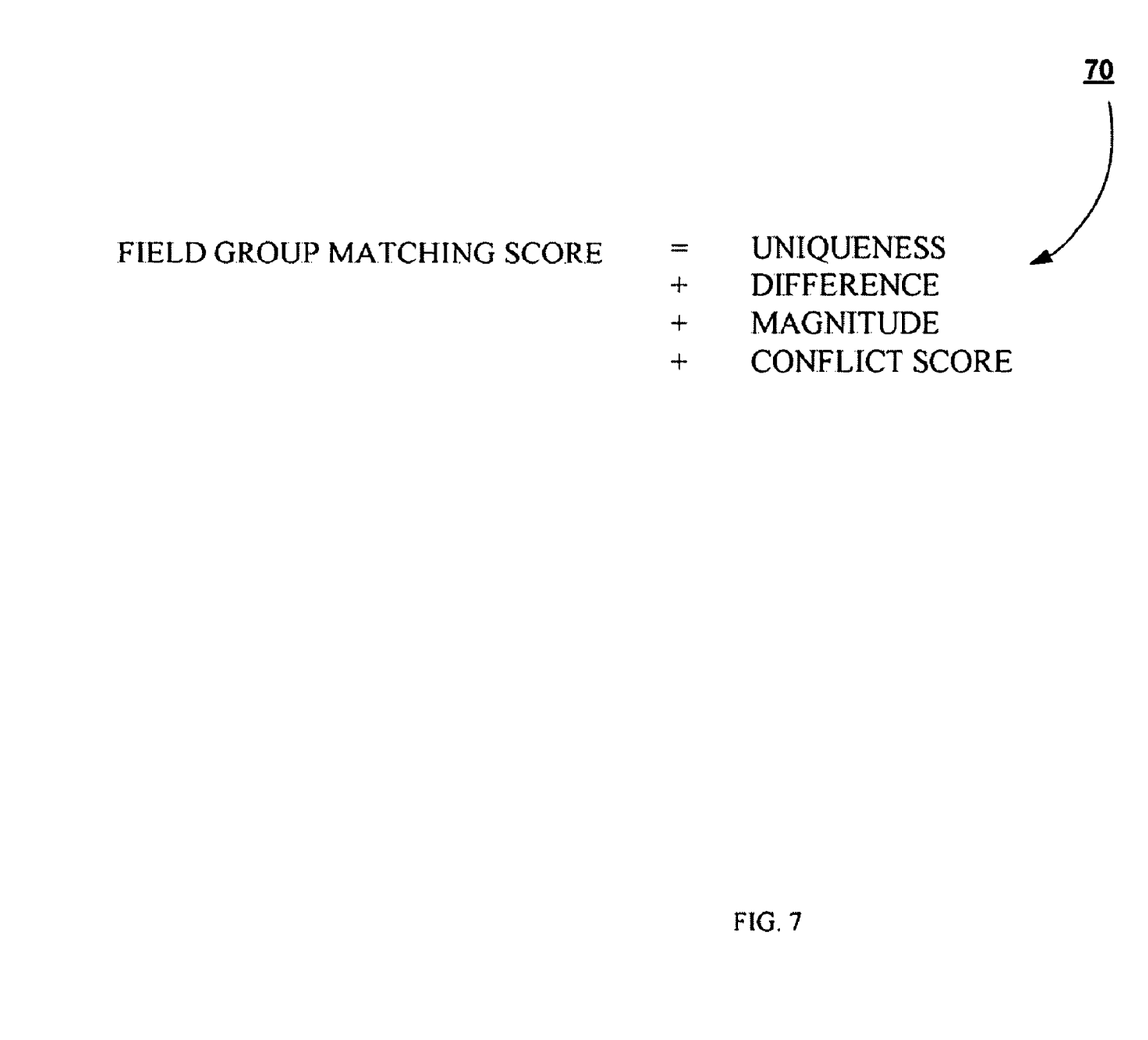
FIG. 7 illustrates a formula for generating an individual field matching score, according to an embodiment of the invention.

FIG. 7 illustrates a formula 70 for generating an individual field group matching score, according to an embodiment of the invention. As illustrated in FIG. 7, according to one embodiment of the invention, the field group matching score is calculated based on a combination of four components referred to herein as "uniqueness", "difference", "magnitude", and "conflict score". The first three components, "uniqueness", "difference", and "magnitude" are determined based on a string metric known as the Levenshtein Distance. The Levenshtein Distance (hereinafter, "the Distance") between two strings is given by the minimum number of operations needed to transform one string into the other, where an operation is an insertion, deletion, or substitution of a single character.

Figure 8:
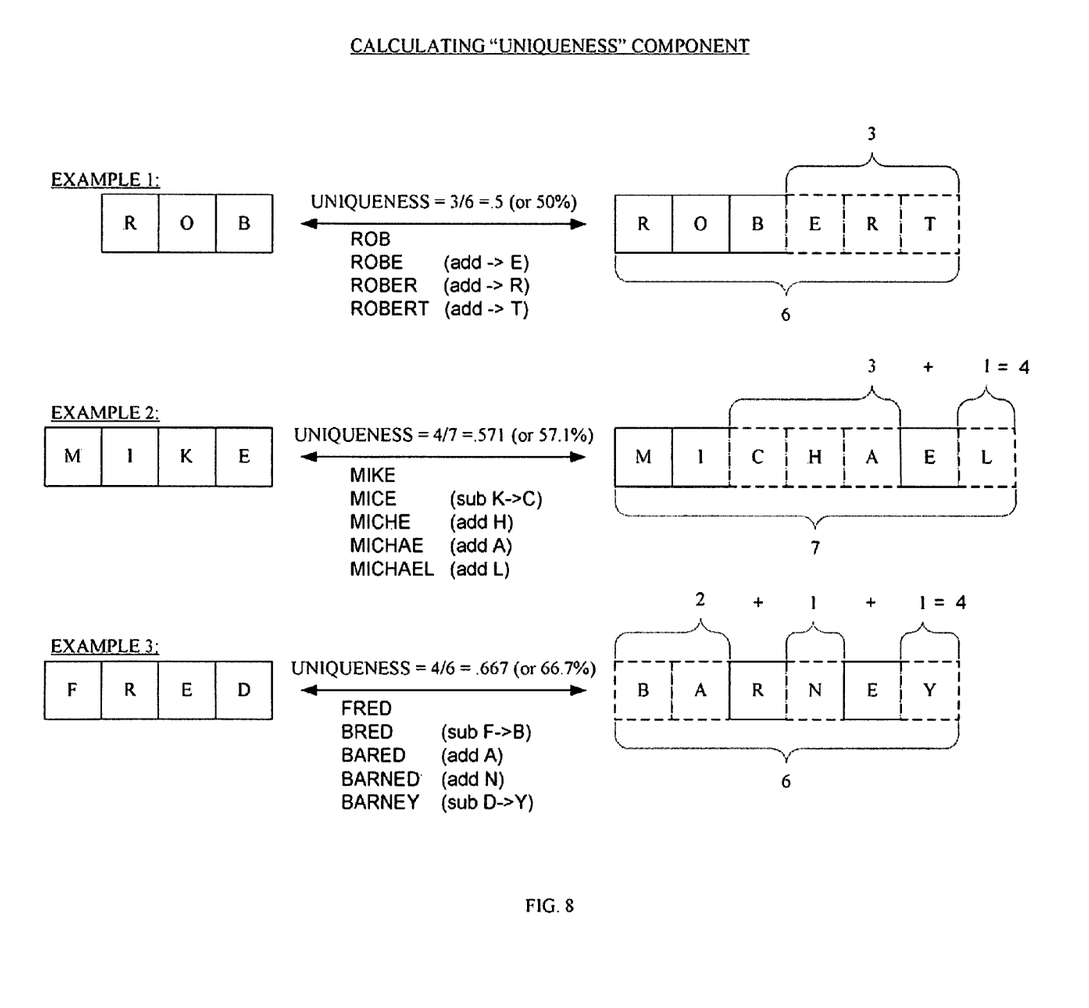
FIG. 8 illustrates various examples of how a uniqueness score is calculated for a grouping of fields, according to an embodiment of the invention.

As illustrated in FIG. 8, the uniqueness score is determined based on the Distance as a percentage of the longer character array. As shown in Example 1 of FIG. 8, the Distance between the two strings "ROB" and "ROBERT" is three. For example, to derive the string "ROB" from the string "ROBERT" requires three character deletions, for the characters "ERT". Accordingly, the uniqueness score is the Distance over the total number of characters in the longer of the two strings—in this case six for the six letters in "ROBERT". Consequently, the uniqueness score the field pair in Example 1 of FIG. 8 is three over six (3/6), or 50%. As illustrated in Example 2, the uniqueness score for the strings "MIKE" and "MICHAEL" is four over seven (4/7), or 57.1%. Finally, in Example 3, the uniqueness score for the strings "FRED" and "BARNEY" is four over six (4/6), or 66.7%. Although the examples shown in FIG. 8 are illustrated on a field by field basis, (e.g., first name fields), in one embodiment of the invention, the uniqueness score, as well as the difference and magnitude scores, calculated for a concatenated string including several fields.

Figure 9:
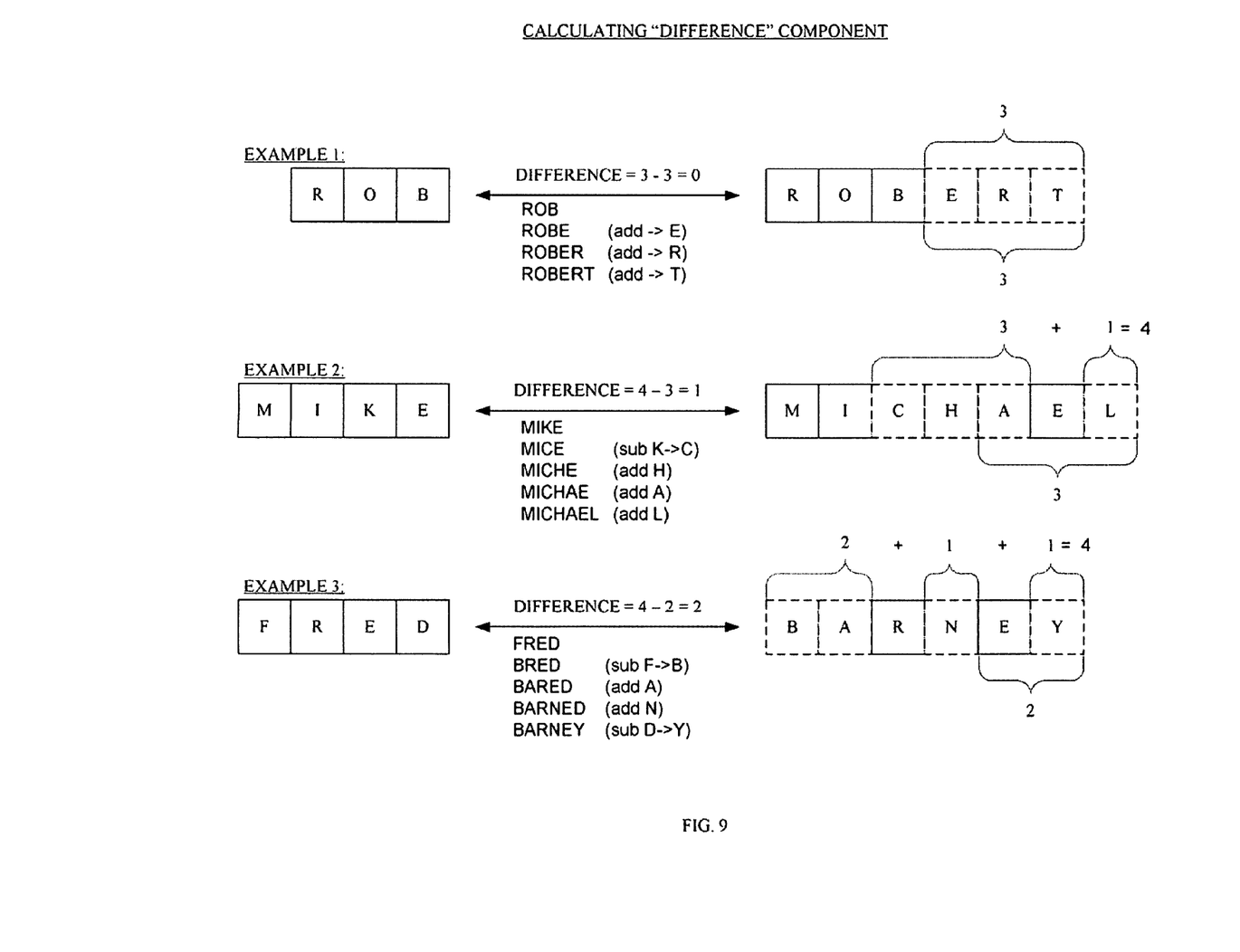
FIG. 9 illustrates various examples of how a difference score is calculated for a grouping of fields, according to an embodiment of the invention.

The second component of the field matching score for a field pair is referred to herein as the "difference" component or score. Like the uniqueness score, the difference component is calculated based in part on the Distance. However, the difference score compensates for any difference between the two strings that is solely attributable to the longer length of the long string. Accordingly, the difference score is essentially the Distance, reduced by the number of add operations required to lengthen the shorter of the two strings to equal the size of the longer string.

As illustrated in Example 1 of FIG. 9, the difference score for the strings "ROB" and "ROBERT" is zero, as the difference between the two strings is solely attributable to the extra characters, "ERT", of the longer string. In Example 2, the difference score is one. Of the four operations required to transform the string "MIKE" to "MICHAEL", three of the operations are necessary to add characters (e.g., "H", "A" and "L"). Finally, the difference score for the two strings shown in Example 3—"FRED" and "BARNEY"—is two. Of the four operations required to convert the shorter string to the longer string, two of the operations are for adding the characters to the shorter string to equal the length of the longer string. Accordingly, two is subtracted from the Distance, four, to arrive at a difference score of two.

Figure 10:
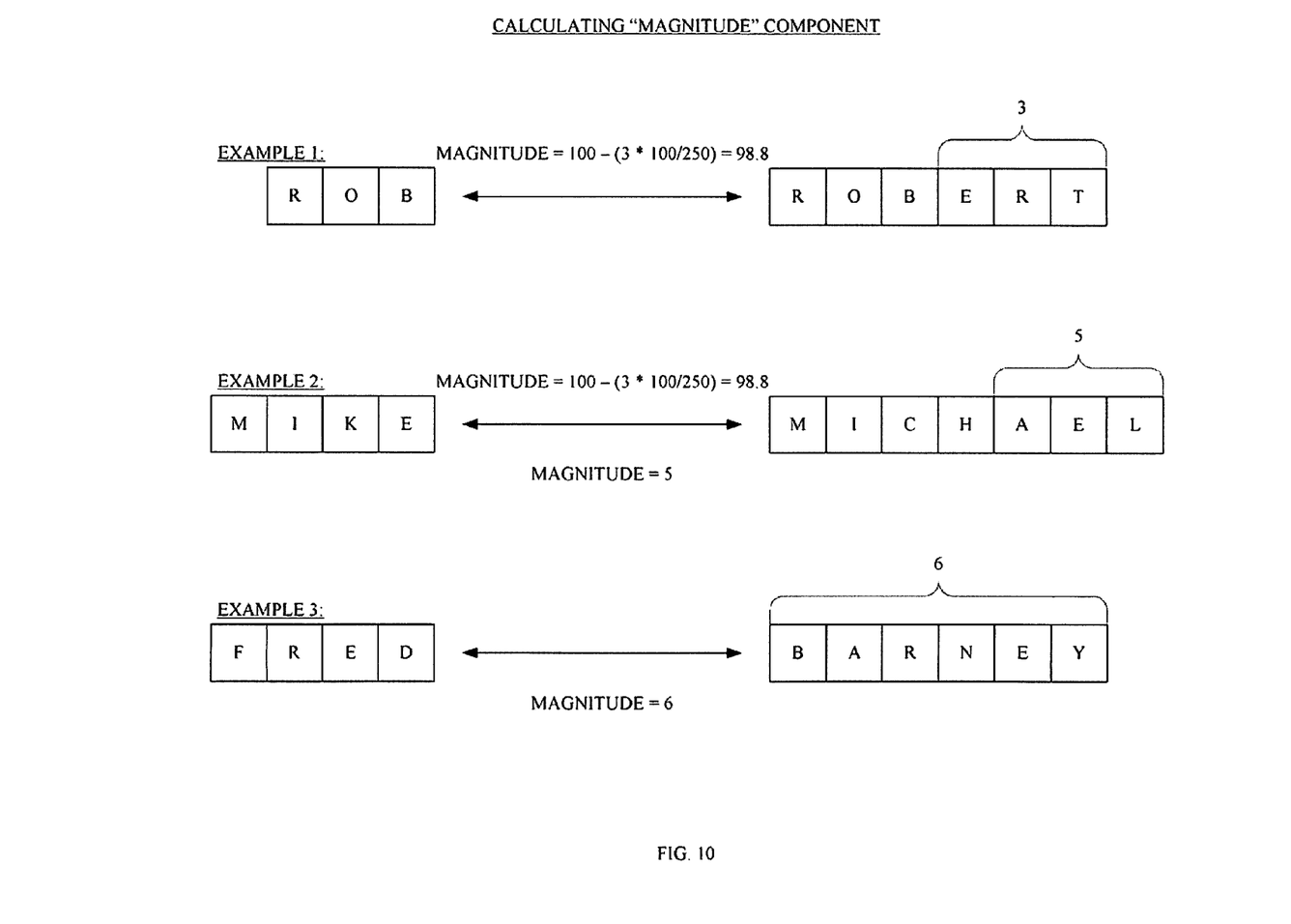
FIG. 10 illustrates various examples of how a magnitude score is calculated for a grouping of fields, according to an embodiment of the invention.

The third component of the field matching score is referred to as the magnitude component or score. The magnitude score takes into consideration the absolute difference in the size of the two strings being compared. In one embodiment, the magnitude score is calculated by normalizing the Levenshtein Distance as shown in FIG. 10. For instance, as illustrated in Example 1 of FIG. 10, the Distance for the strings "ROB" and "ROBERT" is three. By setting the upper bound of Distances to two-hundred fifty, and then normalizing the Distance on a scale of zero to one-hundred, the magnitude for the strings in Example 1 is equal to 98.8. As illustrated in Examples 2 and 3 of FIG. 10, the magnitude scores in those Examples is 98.4. If two strings had a Distance score greater than two-hundred fifty, the magnitude is automatically set to zero. Of course, in various embodiments of the invention, the upper and lower bounds may be different, and the scale may be something other than from zero to one-hundred.

The fourth and final component comprising a field matching score is referred to as a conflict score. In contrast to the first three components—uniqueness, difference and magnitude—the conflict score is generally calculated on a field by field basis. For instance, in one embodiment of the invention, the conflict score is simply a combination of the uniqueness, difference, and magnitude scores calculated individually for each field in a group. For example, for the name field group, the uniqueness, difference, and magnitude scores are calculated for the first name field, and again for the last name field. Then, the two calculated scores are combined to form a conflict score for the field group. Thus, the field matching score for a field group is based on the uniqueness, difference and magnitude score, calculated for the group (e.g., the concatenated string), and the conflict score, which is calculated by combining the uniqueness, difference and magnitude scores calculated for each individual pairing of common fields in the group (e.g., first name fields, last name fields).

In one embodiment of the invention, the field matching scores and/or the record matching scores may be normalized, so as to enable more meaningful comparisons. For instance, the record matching score for each record pair may be normalized to a score between zero and one-hundred, where one-hundred indicates a perfect match. Also, as described above, the algorithm may be configurable to provide different weightings The foregoing description of various implementations of the invention has been presented for purposes of illustration and description. It is not exhaustive and does not limit the invention to the precise form or forms disclosed. Furthermore, it will be appreciated by those skilled in the art that the present invention may find practical application in a variety of alternative contexts that have not explicitly been addressed herein. Finally, the illustrative processing steps performed by a computer-implemented program (e.g., instructions) may be executed simultaneously, or in a different order than described above, and additional processing steps may be incorporated. The invention may be implemented in hardware, software, or a combination thereof. When implemented partly in software, the invention may be embodied as instructions stored on a computer- or machine-readable medium. In general, the scope of the invention is defined by the claims and their equivalents.

What is claimed is:

1. A method for identifying matching records in two record sets, the method comprising:

initiating a synchronization process over a computer network;

responsive thereto, analyzing a first record set to match records of the first record set with records of a second record set maintained remotely from the first record set;

selecting a subset of fields shared in common by the records of the two record sets to determine a record match;

for each pairing of a subject record from the first record set and a subject record from the second record set, calculating, based on the subset of fields selected, a record matching score, wherein said each pairing of a subject record from the first record set and a subject record from the second record set comprises a record pair, the record matching scores are calculated based on how well individual fields of the subset of fields in each subject record pair compared, the individual fields of the subset of fields in each subject record pair comprise field group pairings, and for each field group pairing, the individual fields of the subset of fields in each subject record pair are concatenated to form strings;

identifying the matching records of the first record set and the second record set by identifying record pairs having a highest record matching score over a threshold;

excluding identified matched record pairs from further analysis, and successively identifying further matching record pairs according to associated record matching scores of the further matching record pairs and excluding the further matching record pairs from further analysis until all record pairs having record matching scores exceeding the threshold are identified, and for each pair of the strings representing each field group pairing, calculating a field group matching score, the field group matching scores each comprising a uniqueness component, a difference component, a magnitude component and a conflict score.

2. The method of claim 1, wherein the synchronization process is initiated at a handset.

3. The method of claim 1, wherein the synchronization process is initiated at a mobile device.

4. The method of claim 1, wherein the synchronization process is initiated at a source record device.

5. The method of claim 1, wherein the synchronization process is initiated according to a schedule.

6. The method of claim 1, wherein the subset of fields in each subject record pair comprises fields of records of the two record sets most likely to indicate whether individual records of the two record sets match one another.

7. The method of claim 1, wherein prior to the identifying of the matching records of the first record set and the second record set, scores of each component of each record of each record pair are normalized before the record matching scores of said each record pairs are derived.

8. The method of claim 1, wherein the individual fields are grouped according to field grouping criteria.

9. The method of claim 1, wherein concatenation order is determined according to byte-level comparisons of the individual fields.

10. The method of claim 1, wherein the uniqueness component, the difference component and the magnitude component of each field group matching score is determined on a basis of a Levenshtein Distance between subject ones of the strings undergoing comparison.

11. The method of claim 1, further comprising combining the field group matching scores for each pair of the field group pairings to determine the record matching score for each pairing of a subject record from the first record set and a subject record from the second record set.

12. The method of claim 11, wherein the field group matching scores are weighted prior to being combined.

13. The method of claim 2, wherein weighting of the field group matching scores is determined according to which field group pairings are deemed to be most suggestive of a record match.

14. The method of claim 1, wherein a score of the uniqueness component is determined based on a Levenshtein Distance as a percentage of a longer one of character arrays comprising the strings.

15. The method of claim 1, wherein the difference component compensates for any difference between two strings that is solely attributable to a longer length of a long one of the strings.

16. The method of claim 1 wherein the magnitude component takes into consideration an absolute difference in a size of two strings being compared.

17. The method of claim 1, wherein the conflict score is calculated on a field by field basis.

18. The method of claim 17, wherein the conflict score is calculated by combining calculated scores of the uniqueness component, the difference component and the magnitude component for each individual field group pairing.

* * * * *

UNITED STATES PATENT AND TRADEMARK OFFICE
CERTIFICATE OF CORRECTION

PATENT NO. : 8,131,759 B2
APPLICATION NO. : 12/253412
DATED : March 6, 2012
INVENTOR(S) : Jonathan Salcedo Page 1 of 1

It is certified that error appears in the above-identified patent and that said Letters Patent is hereby corrected as shown below:

In column 10, line 3, in Claim 13, please delete "claim 2," and insert --claim 12,--

In column 10, line 15, in Claim 16, please delete "claim 1" and insert --claim 1,--

Signed and Sealed this
Eighth Day of May, 2012

David J. Kappos
*Director of the United States Patent and Trademark Office*

UNITED STATES PATENT AND TRADEMARK OFFICE
CERTIFICATE OF CORRECTION

PATENT NO. : 8,131,759 B2
APPLICATION NO. : 12/253412
DATED : March 6, 2012
INVENTOR(S) : Jonathan Salcedo It is certified that error appears in the above-identified patent and that said Letters Patent is hereby corrected as shown below:

On the cover page, please amend the assignee information as follows:

(73) Assignee: please delete "Asurion Corporation" and insert --Asurion, LLC--

Signed and Sealed this
Ninth Day of October, 2012

David J. Kappos
*Director of the United States Patent and Trademark Office*